(12) United States Patent
Kasper

(10) Patent No.: US 6,945,698 B2
(45) Date of Patent: Sep. 20, 2005

(54) SHAFT SPEED MONITOR

(75) Inventor: Timothy K. Kasper, 356 Expressway Ct., Gaylord, MI (US) 49735

(73) Assignee: Timothy K. Kasper, Gaylord, MI (US)

( * ) Notice: Subject to any disclaimer, the term of this patent is extended or adjusted under 35 U.S.C. 154(b) by 112 days.

(21) Appl. No.: 10/641,468

(22) Filed: Aug. 14, 2003

(65) Prior Publication Data
US 2004/0032997 A1 Feb. 19, 2004

Related U.S. Application Data
(60) Provisional application No. 60/403,723, filed on Aug. 15, 2002.

(51) Int. Cl.$^7$ .............................. F16C 32/00; G01P 3/44
(52) U.S. Cl. ........................................ 384/448; 324/173
(58) Field of Search .......................... 384/448; 324/173, 324/174, 207.25

(56) References Cited
U.S. PATENT DOCUMENTS 6,229,298 B1 * 5/2001 Sakamoto et al. .......... 324/174
6,232,772 B1 * 5/2001 Liatard et al. ........... 324/207.25
6,595,693 B1 * 7/2003 Message et al. ............. 384/448
6,605,938 B1 * 8/2003 Sentoku et al. ............. 324/174
6,796,713 B2 * 9/2004 Landrieve .................... 384/448

* cited by examiner

Primary Examiner—Thomas R. Hannon
(74) Attorney, Agent, or Firm—Reising Ethington Barnes Kisselle & Learman P.C.

(57) ABSTRACT

The shaft speed monitor includes a hub with a bearing bore with an open end and a bearing end. A bearing stop flange is adjacent to the bearing end. A bearing is pressed into the bearing bore and is seated against the stop flange. A lock ring axially fixes the bearing in the bearing bore. A bobbin with an embedded multi-pole ring magnet and a coil is inserted into the bearing bore in the hub. A spindle with a toothed ring passes through the bearing. The toothed ring is in radial alignment with the ring magnet. Leads connected to the coil pass through a grommet. The grommet is held in a grommet slot in the hub. A seal is pressed into a seal counter bore in the hub and seals against a sealed surface on the spindle as well as against the grommet.

12 Claims, 3 Drawing Sheets

SHAFT SPEED MONITOR

This application claims the benefit of Provisional Application No. 60/403,723, filed Aug. 15, 2002.

TECHNICAL FIELD

The shaft speed monitor includes a coil pack assembly mounted in a housing adjacent to one side of a bearing, a toothed ring mounted on a shaft rotatably supported by the bearing and positioned in axial alignment with the coil pack assembly, and a seal that seals between the shaft and the housing and forms a sealed compartment on one side of the bearing that encloses the coil pack assembly and the toothed ring.

BACKGROUND OF THE INVENTION

Control and monitoring systems on machines used today often include shaft speed monitors. Some of these shaft speed monitors merely monitor the speed and let a machine operator know the shaft speed. If the speed is incorrect, the operator can make required adjustments. Other shaft speed monitors send a signal proportion to the measured shaft speed, to a controller. The controller receives the shaft speed signal, processes the signal and generates a response if required. This response could be to change some function of the machine or to send a warning to an operator.

Shaft speed monitors currently used include a toothed wheel mounted on a rotating member and a signal generator mounted close to the toothed wheel. The signal generator as well as the toothed wheel have been relatively unprotected and exposed to the elements. Dust, dirt and foreign matter can degrade the signal generated by the shaft speed monitor. Water can also degrade the signal generated. Foreign objects such as small rocks can knock the sensor assembly out of alignment with the toothed ring and render the shaft speed monitor inoperable

SUMMARY OF THE INVENTION

The shaft speed monitor assembly includes a hub with a bearing bore, a bearing mounted in the bearing bore, and a spindle rotatably supported by the bearing. A snap ring holds the bearing in the bearing bore. A coil pack assembly includes a neodymium/nylon ring magnet embedded in a glass fiber and nylon bobbin. A coil groove in the bobbin holds a copper wire coil. The bobbin is pressed into the bearing bore in the hub to a position adjacent to the snap ring and on the opposite side of the snap ring from the bearing. A toothed ring is pressed onto the spindle and positioned in radial alignment with the ring magnet in the coil pack assembly. A U-shaped grommet slot is provided in a cylindrical portion of the hub and extends axially into a cylindrical portion from the open end. A grommet is mounted in the U-shaped grommet slot. Leads from the coil in the coil pack assembly pass through the grommet. A shaft seal seals between the bearing bore in the hub and the spindle and forms a sealed compartment inside the hub and between the seal and the bearing. The coil pack assembly and the toothed ring are encased in the sealed compartment.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENTS

Figure 1:
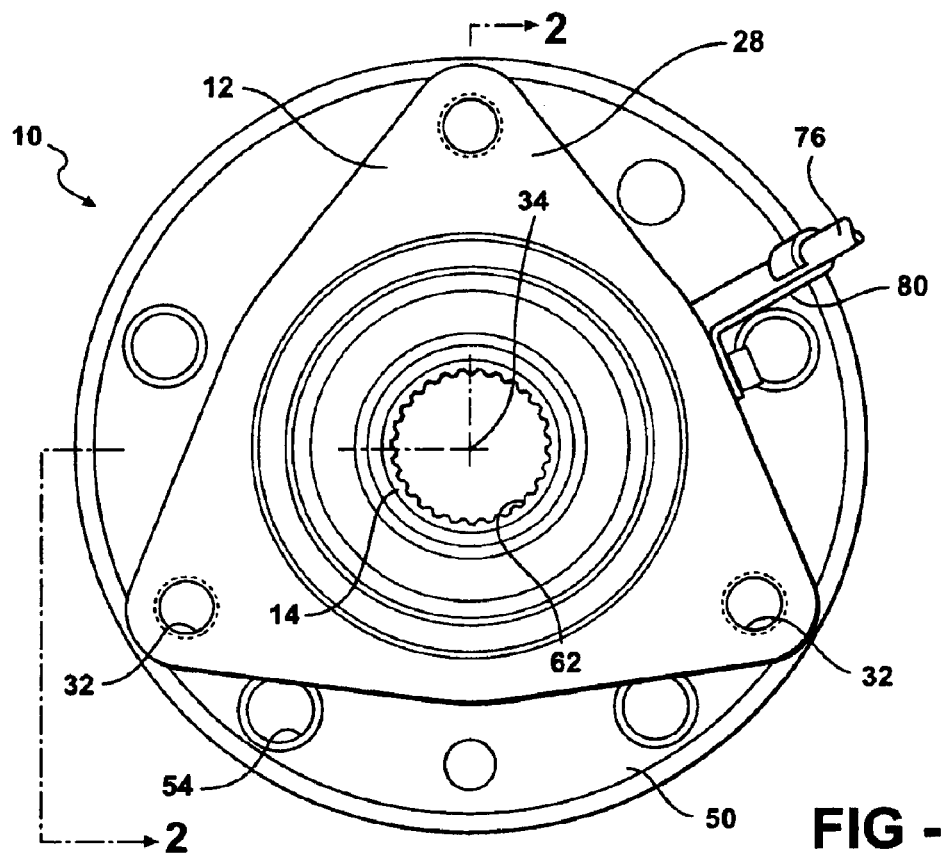
FIG. 1 is an elevational view of the shaft speed monitor mounted in a sealed compartment.
Figure 2:
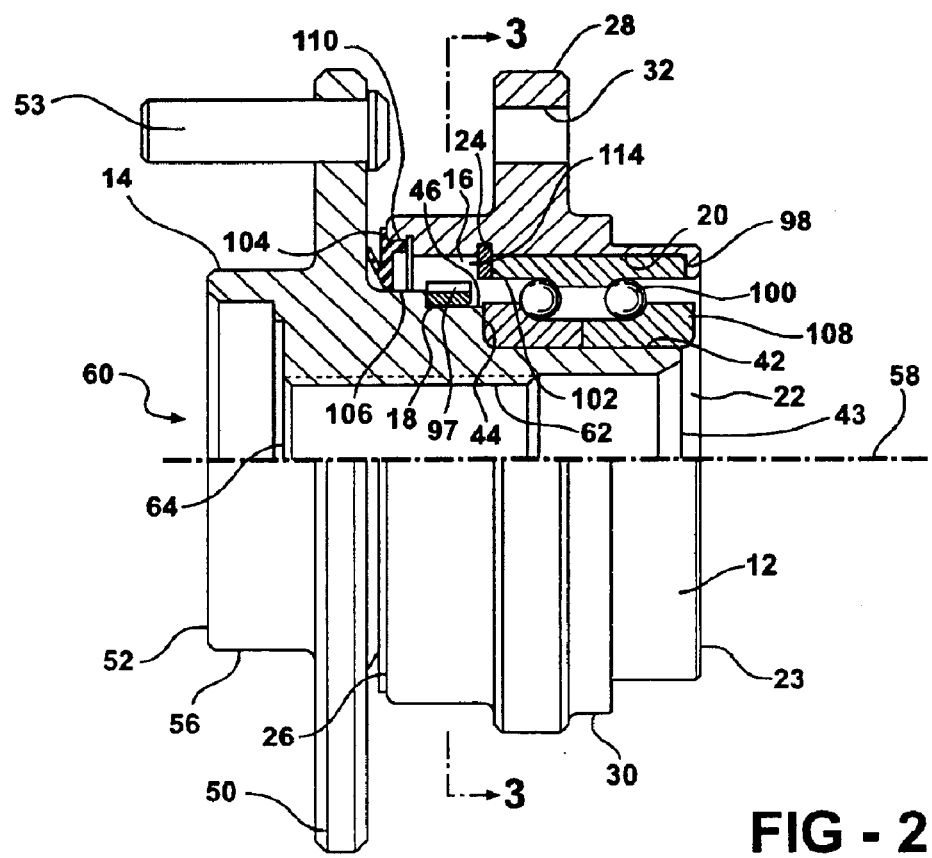
FIG. 2 is a sectional view taken along line 2—2 in FIG. 1.
Figure 3:
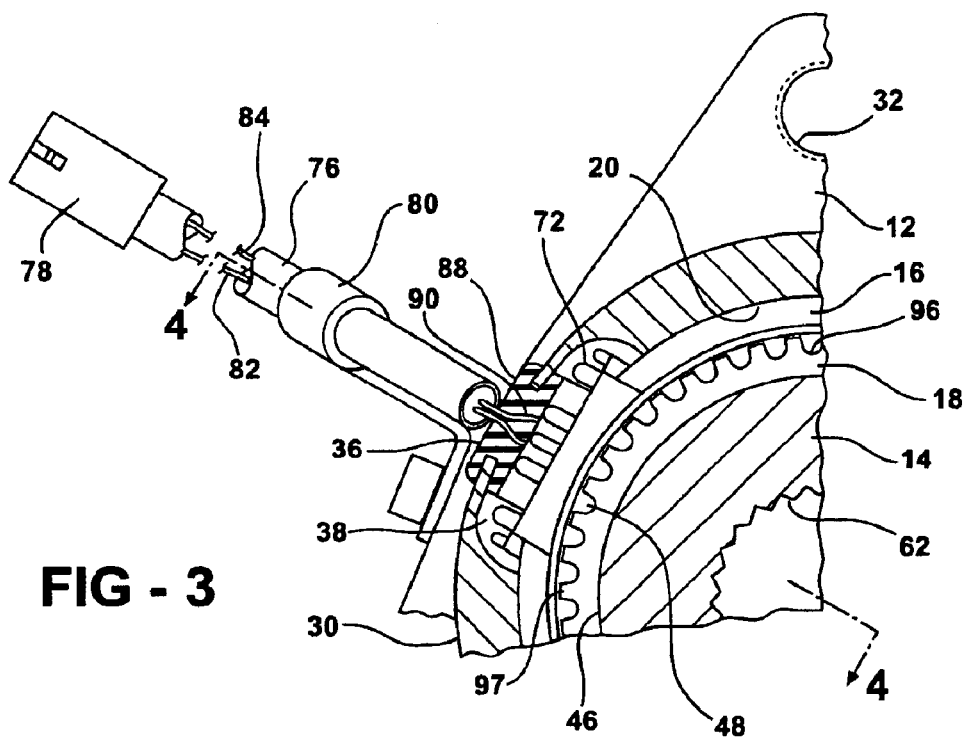
FIG. 3 is a sectional view taken along line 3—3 in FIG. 2 with parts broken away.

The shaft speed monitor assembly 10 includes a hub 12, a spindle 14, a coil pack assembly 16 and a toothed ring 18. The hub 12 can be any pillow block. As shown in the drawing the hub 12 and spindle are for a front wheel of a vehicle with front wheel drive. Hub 12 has a bearing bore 20. A bearing stop flange 22 extends radially inward on a partially closed end or bearing end 23 of the bearing bore 20. The stop flange could be replaced by a snap ring. A snap ring groove 24 extends radially outward from the bearing bore 20 and is between the bearing stop flange 22 and the open end 26 of the hub 12. A mounting flange 28 extends radially outward from the cylindrical portion 30 of the hub 12 with the bearing bore 20. The mounting flange 28 has three bolt holes 32 for attaching the hub 12 to a vehicle. As shown, the bolt holes 32 have axes that are parallel to the axis 34 of the bearing bore 20. A U-shaped grommet slot 36 is provided in the cylindrical portion 30 of the hub 12 and extends axially into the cylindrical portion from the open end 26 toward the snap ring groove 24. A recessed area 38 in the bearing bore 20 and around the U-shaped grommet slot 36 forms a grommet retainer flange 40. Pillow blocks or hubs 12 can be provided with mounting flanges 28 that have a variety of shapes. The bolt holes 32 can, for example, be transverse to the bearing bore axis 34. Pillow blocks can also be clamped in place in some systems without mounting flanges or bolt holes through the block.

The spindle 14 as shown has a cylindrical bearing mounting surface 42 adjacent to an inboard end 43. A radially extending wall, at one end of the bearing mounting surface 42, forms a bearing stop surface 44. A cylindrical toothed ring mounting surface 46 is coaxial with the bearing mounting surface 42, larger in diameter than the bearing mounting surface and extends from the bearing stop surface 44 to a toothed ring stop surface 48. A wheel mounting flange 50 extends radially outward near the outboard end 52 of the spindle 14. Five wheel retainer studs 53 are pressed into bores 54 through the wheel mounting flange 50. A cylindrical surface 56, extending from the outboard end 52 of the spindle 14 to the wheel mounting flange 50, centers a wheel on the spindle axis 58.

A passage 60 through the spindle 14 receives one end of a drive shaft. The drive shaft has splines that engage a splined portion 62 of the bore 60. The drive shaft is retained in the spindle 14 by a retainer that engages the clamping surface 64 in the passage 60.

Figure 4:
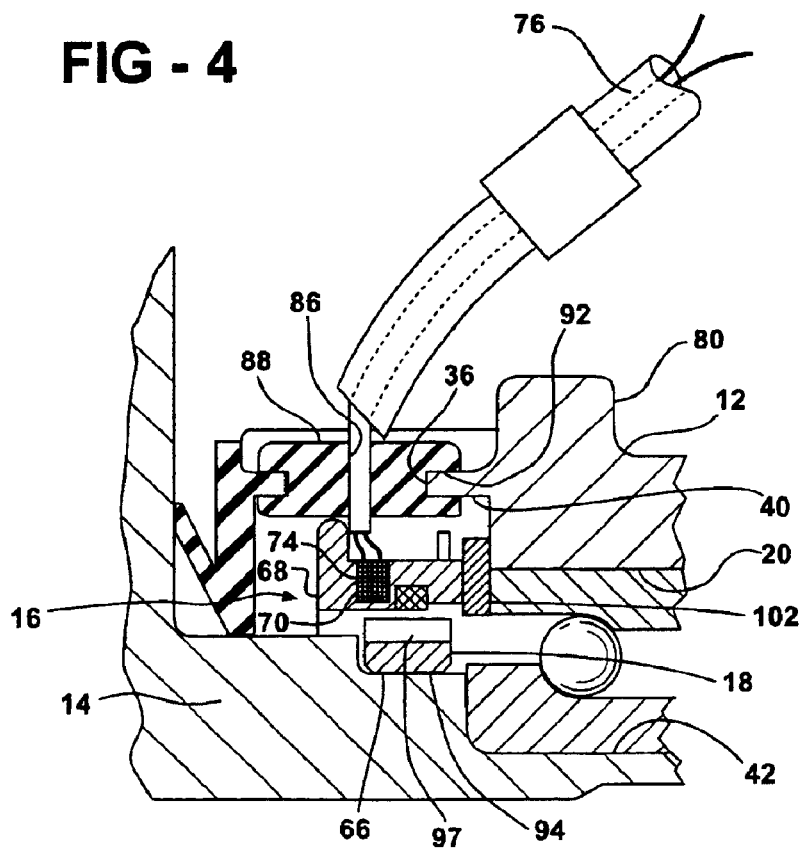
FIG. 4 is an enlarged sectional view taken along line 4—4 in FIG. 3 with parts broken away.
Figure 5:
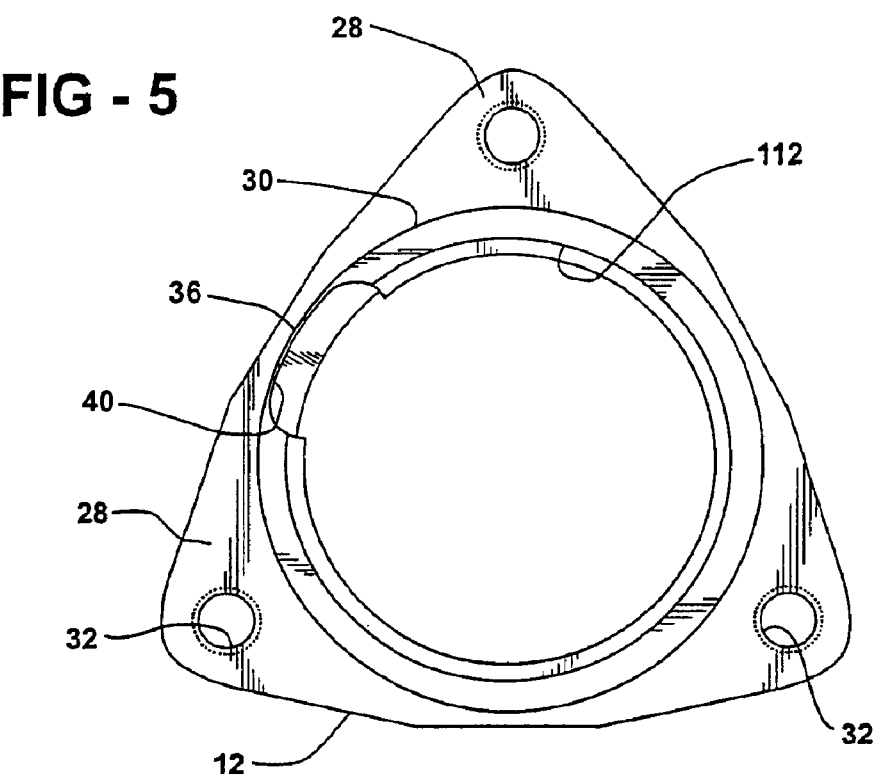
FIG. 5 is an elevation view of the hub.
Figure 6:
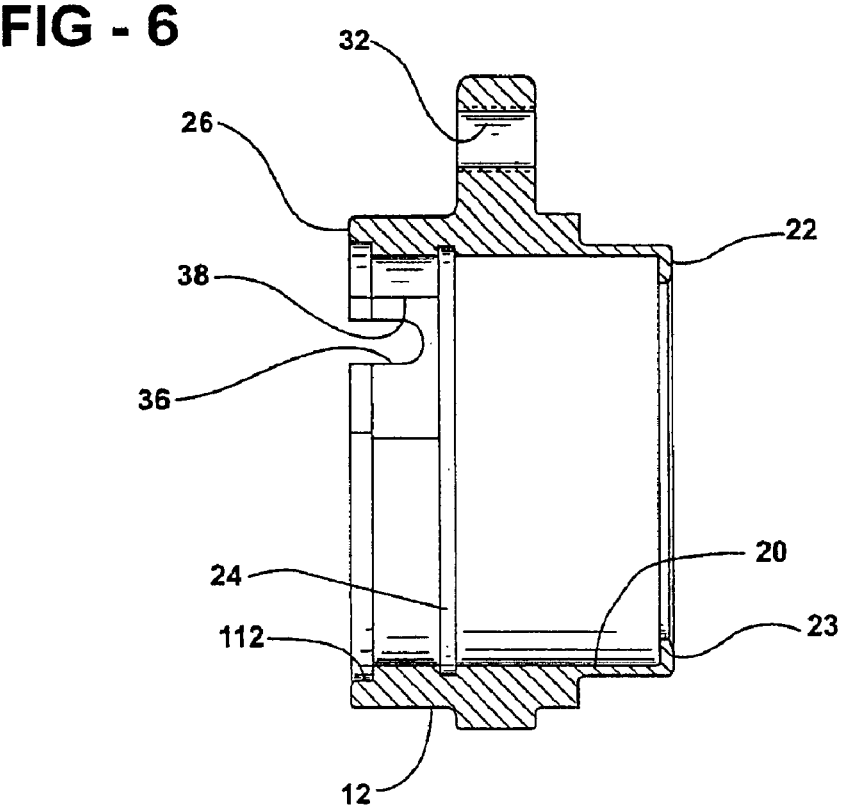
FIG. 6 is a sectional view taken along line 6—6 in FIG. 5.

The coil pack assembly 16 includes a neodymium/nylon ring magnet 66 embedded in a glass fiber and nylon bobbin 68 as shown in FIG. 4. The neodymium/nylon magnet has 104 poles. The glass fiber and nylon bobbin 68 has a coil groove 70 with a radially outward facing opening and a terminal section 72. A winding 74 is wound in the coil groove 70. The winding 74 is a copper wire wound in the coil groove 70. Both ends of the winding 74 are anchored in the terminal section 72.

A cable 76 has a connector 78 on one end. Cable holders 80 are attached to the cable 76 in selected positions. Two leads 82 and 84 extend from the other end of the cable 76. The lead 82 passes through a passage 86 through a grommet 88 and is attached to one end of the winding 74 in the terminal section 72. The lead 84 passes through a passage 90 through the grommet 88 and is attached to the other end of the winding 74 in the terminal section 72. The grommet 88 has a groove 92 that extends the length of three sides of the grommet. The groove 92 passes through the ends only of the fourth side of the grommet.

A toothed ring 18 has a generally cylindrical passage 94. A plurality of grooves 96, in the radially outer edge of the ring 18, form 52 teeth 97 that extend radially outward from the tooth ring 18.

During assembly, the outer race 98 of the bearing 100 is pressed into the bearing bore 20 in the hub 12 and against the bearing stop flange 22. A snap ring 102 is inserted into the snap ring groove 24 to axially fix the bearing 100 relative to the hub 12. The bobbin 68 is inserted into the bearing bore 20 with the ring magnet 66 on the side of the bobbin adjacent to the snap ring 102 a shown in FIG. 4. At the same time the bobbin 68 is pressed into the bearing bore 20, the grommet 88 is pressed into the U-shaped grommet slot 36. The grommet retainer flange 40 enters the groove 92 as the grommet 88 is pressed into the grommet slot 36. When the grommet 88 is seated in the U-shaped grommet slot 36, a water tight seal is formed between the grommet 88 and the hub 12.

A shaft seal 104 is placed on the cylindrical sealing surface 106 on the spindle 14. After the shaft seal 104 is in place, the toothed ring 18 is pressed onto the cylindrical toothed ring mounting surface 46 until it contacts the toothed ring stop surface 48. The cylindrical bearing mounting surface 42 on the spindle 14 is than placed partially into the inner race 108 of the bearing 100. After the spindle 14 is pressed most of the way into the bearing 100, the radially outer edge 110 of the seal 104 is pressed into a cylindrical seal counter bore 112 adjacent to the open end 26 of the hub 12. The spindle 14 is then pressed into the bearing 100 until the inner race 108 contacts the bearing stop surface 44.

The coil pack assembly 16 and the toothed ring 18 are enclosed in a coil pack chamber 114 with one end closed by the seal 104, the other end closed by the bearing 100, and the U-shaped grommet slot 46 closed with a grommet 88. The bearing 100 will normally have at least one end sealed if it is a ball bearing. If the bearing 100 is a tapered roller bearing, a shaft seal will be provided adjacent to the inboard end 43 of the spindle 14. Seals for the bearing 100 are not shown in a drawing.

The shaft speed monitor 10 is described above mounted on a wheel for a motor vehicle. Such measurements are needed for anti-skid and anti-lock vehicle brake systems. Wheel speed measurements can also be used for crash control systems. However, a shaft speed monitor 10 can be employed to monitor the speed of shafts on most mobile machinery as well as on stationery machinery where there is a need to know the speed of rotation of a shaft. The shaft speed measurement can be used to automatically adjust the speed of a machine component or as an aid to manually adjusting shaft speed. The shaft speed measurement can also be used to provide a warning if the speed of the shaft increases or decreases from a predetermined speed range.

It is to be understood that other embodiments of the invention which accomplish the same function are incorporated herein within the scope of any ultimately allowed patent claims.

I claim:

1. A shaft speed monitor comprising:

a hub with a bearing bore, a hub bearing end, a hub open end, a first bearing positioning stop extending radially inward from the bearing bore, a second bearing positioning stop extending radially inward from the bearing bore, a cylindrical seal counter bore extending axially inward from the hub open end and concentric with the bearing bore, and a grommet passage extending radially through the hub between the hub open end and the second bearing positioning stop, and a mounting flange integral with the hub;

a bearing mounted in the bearing bore between the first bearing positioning stop and the second bearing positioning stop and wherein the bearing is axially fixed in the bearing bore by the first bearing positioning stop and the second bearing positioning stop;

a spindle having an inboard end, an outboard end, a bearing mounting surface adjacent to the inboard end, a cylindrical toothed ring mounting surface coaxially with the bearing mounting surface and between the bearing mounting surface and the outboard end, and a cylindrical sealing surface between the toothed ring mounting surface and the outboard end, and wherein the bearing mounting surface is received in the bearing thereby holding the spindle in a position coaxial with the bearing bore and rotatable relative to the hub;

a toothed ring mounted on the toothed ring mounting surface and rotatably fixed relative to the spindle;

a coil pack assembly including a ring magnet embedded in a bobbin, a coil groove in the bobbin and axially spaced from the ring magnet, a coil winding in the coil groove, and wherein the coil pack assembly is mounted in the hub between the second bearing position stop and the cylindrical counter bore with the ring magnet in radial alignment with the toothed ring;

a seal mounted in the cylindrical seal counter bore in the hub and in sealing engagement with the cylindrical sealing surface on the spindle;

a grommet mounted in the grommet passage through the hub; and leads extending through the grommet and connected to the coil winding in the bobbin.

2. A shaft speed monitor, as set forth in claim 1, wherein one of the first bearing positioning stop and the second bearing positioning stop is a snap ring.

3. A shaft speed monitor, as set forth in claim 1, wherein the second bearing positioning stop is a snap ring that is received in a snap ring groove in the bearing bore.

4. A shaft speed monitor, as set forth in claim 1, including a splined bore through the spindle.

5. A shaft speed monitor, as set forth in claim 1, wherein the ring magnet is a neodyium nylon magnet with multiple poles.

6. A shaft speed monitor, as set forth in claim 1, wherein the first bearing positioning stop is a bearing stop flange that extends radially inward from the bearing bore adjacent to the hub bearing end.

7. A shaft speed monitor comprising:

a hub with a bearing bore, a hub bearing end, a bearing stop flange in the bearing bore adjacent to the hub bearing end, a snap ring groove extending radially outward from the bearing bore, a hub open end, a cylindrical seal counter bore extending axially from the hub open end toward the snap ring groove, a grommet passage extending radially through the hub between the hub open end and the snap ring groove, and a mounting flange integral with the hub;

a bearing mounted in the bearing bore between the hub bearing end and the snap ring groove;

a spindle having an inboard end, an outboard end, a bearing mounting surface adjacent to the inboard end, a cylindrical toothed ring mounting surface coaxial with the bearing mounting surface and between the bearing mounting surface and the outboard end, and a cylindrical sealing surface between the toothed ring mounting surface and the outboard end, and wherein the bearing mounting surface is received in the bearing thereby holding the spindle in a position coaxial with the bearing bore and rotatable relative to the hub;

a toothed ring mounted on the toothed ring mounting surface and rotatably fixed relative to the spindle;

a coil pack assembly including a ring magnet embedded in a bobbin, a coil groove in the bobbin and axially spaced from the ring magnet, a coil winding in the coil groove, and wherein the coil pack assembly is mounted in the bearing bore of the hub between the snap ring groove and the cylindrical seal counter bore with the ring magnet in radial alignment with the toothed ring;

a seal mounted in the cylindrical seal counter bore in the hub and in sealing engagement with the cylindrical sealing surface on the spindle;

a grommet mounted in the grommet passage through the hub; and leads extending through the grommet and connected to the coil winding in the coil groove in the bobbin.

8. A shaft speed monitor, as set forth in claim 7, including a splined bore through the spindle.

9. A shaft speed monitor, as set forth in claim 7, wherein the ring magnet is a neodyium nylon magnet with multiple poles.

10. A shaft speed monitor, as set forth in claim 7, wherein the grommet passage also extends axially through the hub open end and the grommet is in sealing contact with the seal mounted in the cylindrical seal counter bore.

11. A shaft speed monitor, as set forth in claim 7, wherein the spindle includes a radially extending mounting flange.

12. A shaft speed monitor assembly method comprising:

pressing a bearing into an open end of a bearing bore in a hub until the bearing is seated against a bearing stop flange adjacent to a hub bearing end;

inserting a snap ring into the open end of the bearing bore and into a snap ring groove in the bearing bore in the hub to axially fix the bearing in the bearing bore;

inserting a bobbin into the bearing bore with the bobbin adjacent to the snap ring;

inserting a grommet with leads passing through the grommet and connected to a coil winding in the bobbin into a grommet slot in the hub as the bobbin is inserted into the bearing bore;

placing a shaft seal on a cylindrical sealing surface on a spindle;

pressing a toothed ring onto a cylindrical ring mounting surface on a spindle;

pressing the spindle part way into the bearing;

pressing the seal into a seal counter bore in the open end of the hub; and pressing the spindle the rest of the way into the bearing and radially aligning the toothed ring with a ring magnet embedded in the bobbin.

* * * * *